(12) United States Patent
Rajakumar

(10) Patent No.: US 7,461,065 B2
(45) Date of Patent: Dec. 2, 2008

(54) METHOD AND SYSTEM FOR UTILIZING SHARED NUMERIC LOCKS

(75) Inventor: Konduru Israel Rajakumar, Overland Park, KS (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 11/344,310

(22) Filed: Jan. 31, 2006

(65) Prior Publication Data

US 2007/0179936 A1    Aug. 2, 2007

(51) Int. Cl.
*G06F 17/30* (2006.01)
(52) U.S. Cl. .............................. 707/8; 707/201; 711/141
(58) Field of Classification Search ................. None
See application file for complete search history.

(56) References Cited

U.S. PATENT DOCUMENTS

| | | | | |
|---|---|---|---|---|
| 5,355,477 | A * | 10/1994 | Strickland et al. ............... | 707/8 |
| 5,761,659 | A * | 6/1998 | Bertoni ........................... | 707/8 |
| 5,940,828 | A * | 8/1999 | Anaya et al. .................... | 707/8 |
| 6,240,413 | B1 | 5/2001 | Learmont ........................ | 707/8 |
| 6,351,744 | B1 * | 2/2002 | Landresse ....................... | 707/8 |
| 6,363,387 | B1 | 3/2002 | Ponnekanti et al. | |
| 6,418,438 | B1 | 7/2002 | Campbell | |
| 6,560,601 | B1 * | 5/2003 | Bjornerstedt ................... | 707/8 |
| 6,606,626 | B1 * | 8/2003 | Ponnekanti ..................... | 707/8 |
| 6,772,155 | B1 | 8/2004 | Stegelmann | |
| 6,807,541 | B2 | 10/2004 | Bender et al. | |
| 6,910,039 | B2 | 6/2005 | Daynes | |
| 7,149,737 | B1 * | 12/2006 | Luo et al. ........................ | 707/8 |
| 7,269,588 | B1 * | 9/2007 | Verma et al. .................... | 707/8 |
| 2004/0199512 | A1 * | 10/2004 | Cornwell et al. ............... | 707/9 |
| 2004/0236744 | A1 | 11/2004 | Desai et al. | |
| 2004/0236746 | A1 * | 11/2004 | Lomet ............................. | 707/9 |
| 2006/0004758 | A1 * | 1/2006 | Teng et al. ...................... | 707/9 |

OTHER PUBLICATIONS

Andreas Reuter, *Concurrency on High-Traffic Data Elements*, ACM, 1982.
Patrick E. O'Neil, *The Escrow Transactional Method*, ACM Transactions on Database Systems, vol. 11, No. 4, Dec. 1986, pp. 405-430.

* cited by examiner

Primary Examiner—Hosain T Alam
Assistant Examiner—Syling Yen
(74) *Attorney, Agent, or Firm*—Sawyer Law Group LLP

(57) ABSTRACT

A method and system for performing at least one transaction on at least one column of a table in a database system is disclosed. The method and system include determining whether a first transaction of the at least one transaction fulfills all of the criteria and ensuring that the at least one column is in a shared numeric lock if the first transaction fulfills the at least one criteria. The shared numeric lock allows at least a second transaction fulfilling the at least one criteria to be processed concurrently with the first transaction without releasing the shared numeric lock. The method and system also include processing the first transaction. Thus, the method and system allow multiple transactions to be processed concurrently.

6 Claims, 4 Drawing Sheets

METHOD AND SYSTEM FOR UTILIZING SHARED NUMERIC LOCKS

FIELD OF THE INVENTION

The present invention relates to database management system and more particularly to a method and system for more efficiently performing multiple operations on column(s).

BACKGROUND OF THE INVENTION

Database systems are used for a variety of applications. FIG. 1 depicts a portion of a conventional database system 10 used by a client 20. The database system includes a processor 12 having a local memory 14 and a storage subsystem 15, typically disks. The database system 10 typically stores data in the form of tables, such as the table 16. The table 16 can be considered to have one or more pages 17 and be organized in columns 18 and rows 19.

FIG. 2 depicts a conventional method 30 for performing transactions using the database system 10. Transactions are typically provided to the database system 10 in the form of statements, for example in structured query language (SQL). Transactions may include one or more statements for performing a variety of operations including but not limited to additions, subtractions, other changes or updates to the information stored in the table 16, requests for information, and other operations. The conventional method 30 typically commences after a transaction, or statement, has been provided to the database system 10 for processing.

Locks are obtained on portions of the table 16 for the transaction, via step 32. Typically, a row lock is obtained for a row 19, in step 32. However, in other conventional methods, the granularity of the lock may change. For example, instead of row locking, page or table locking can be performed. The transaction is processed to completion, via step 34. Thus, step 34 includes performing any commit statement necessary to write information to the disks in the storage subsystem 15. The locks, such as the row locks, are released, via step 38. Processing of another transaction may be performed, via step 38. Step 38 may thus repeat steps 32-36 for another transaction.

Although the conventional method 30 functions, one of ordinary skill in the art will readily recognize that in many cases, it is inefficient. Many database systems 10 manage large amounts of data and undergo a large number of operations to a particular row 19 or column 18 in the table 16. For example, in banking, inventory tracking, credit card, or reward systems (e.g. frequent flier) applications, only one or two columns 18 in the table 16 are frequently changed. For example, suppose that the table 16 relates to a banks credit card or other accounts. The table 16 may thus have columns 18 for account holders' names, account holders' addresses, the account type, and the balance of the account. The columns 18 relating to the account holder's name and address change infrequently. In contrast, columns 18 relating to the balance in the account, or the stock of a particular item on hand for an inventory table, change frequently. For a bank having many customers, the column relating to the account balance may be subject to numerous transactions hourly. Moreover, many of the transactions that change such columns share common characteristics. Such transactions are not tied to a specific value of the data in the column. In particular, addition and subtraction operations, otherwise known as credit and debit operations, do not depend upon the balance in the column for which the addition or subtraction operations are used. When such operations are completed using the conventional method 30, each addition and subtraction must wait for the release of the locks in step 36 prior to beginning processing. Stated differently, statements in transactions that attempt to access the same row and column that are already accessed by statements in another transaction must wait for the lock to be released prior to commencing. Consequently, performing such operations on a table 16 may take a significant amount of time to complete.

Accordingly, what is needed is a method and system for more efficiently performing transactions such as addition/subtraction (or credit/debit) transactions in a database system. The present invention addresses such a need.

BRIEF SUMMARY OF THE INVENTION

The present invention provides a method and system for performing at least one transaction on at least one column of a table in a database system. The method and system comprise determining whether a first transaction of the transaction(s) fulfills all of the criteria and ensuring that the column(s) are in a shared numeric lock if the first transaction fulfills the criteria. The shared numeric lock allows at least a second transaction fulfilling all of the criteria to be processed concurrently with the first transaction without releasing the shared numeric lock. The method and system also comprise processing the first transaction.

According to the method and system disclosed herein, the present invention allows multiple transactions that may otherwise attempt to access the same row and column to be processed concurrently without releasing the shared numeric lock. Consequently, transactions such as addition/subtraction transactions may be more efficiently processed.

DETAILED DESCRIPTION OF THE INVENTION

The present invention relates to database systems. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method and system for performing at least one transaction on at least one column of a table in a database system. For example, multiple credit/ debit transactions may be performed on a single column value while preserving the integrity of the value at any given point in time in a general purpose database system. This method and system in accordance with the present invention comprises of a new kind of lower granularity database lock called a "Shared Numeric Lock." In a preferred embodiment to take advantage of this new kind of locks the operations on the table should meet certain criteria as described below. The method and system comprise determining whether a first transaction of the transaction(s) fulfills all of the criteria and ensuring that the column(s) are in a shared numeric lock if the first transaction fulfills all the criteria. The shared numeric lock allows at least a second transaction fulfilling all of the criteria to be processed concurrently with the first transaction without releasing the shared numeric lock. The method and system also comprise processing the first transaction.

The present invention will be described in terms of particular applications and particular database system. However, one of ordinary skill in the art will readily recognize that the method and system may be used in conjunction with other database systems and other applications. The present invention is also described in the context of particular methods having certain steps. However, one of ordinary skill in the art will realize that certain steps may be omitted or combined for clarity. Consequently, the method in accordance with the present invention may include other and/or additional steps. Moreover, the present invention is described in the context of transactions. One of ordinary skill in the art will, however, recognize that transactions can contain multiple statements. Consequently, the method and system may operate effectively for statements within transactions.

Figure 3:
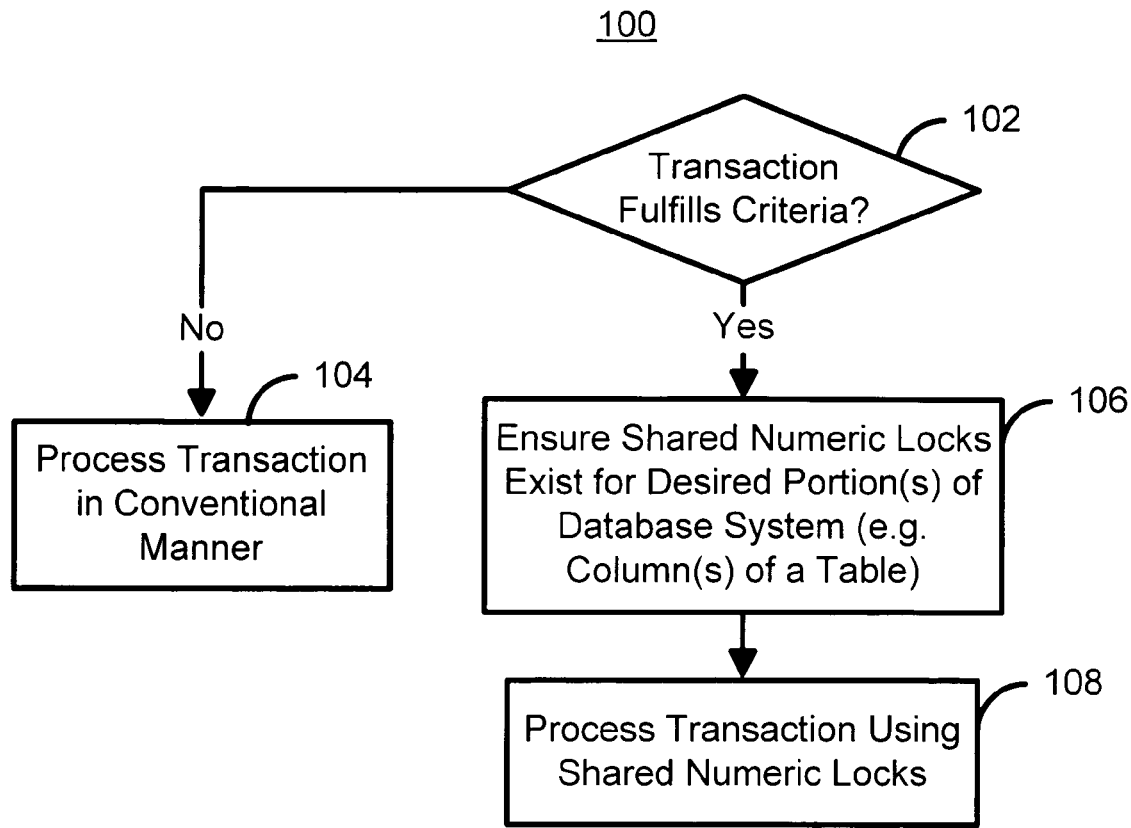
FIG. 3 is a flow chart depicting one embodiment of a method in accordance with the present invention for processing transactions in a database management system.

To more particularly describe the present invention, refer to FIG. 3 depicting a flow chart of one embodiment of a method 100 in accordance with the present invention for processing transactions in a database management system. The method 100 is described in the context of the database system 10 depicted in FIG. 1. One of ordinary skill in the art will readily recognize, however, that the method 100 may be used with other database systems.

Figure 1:
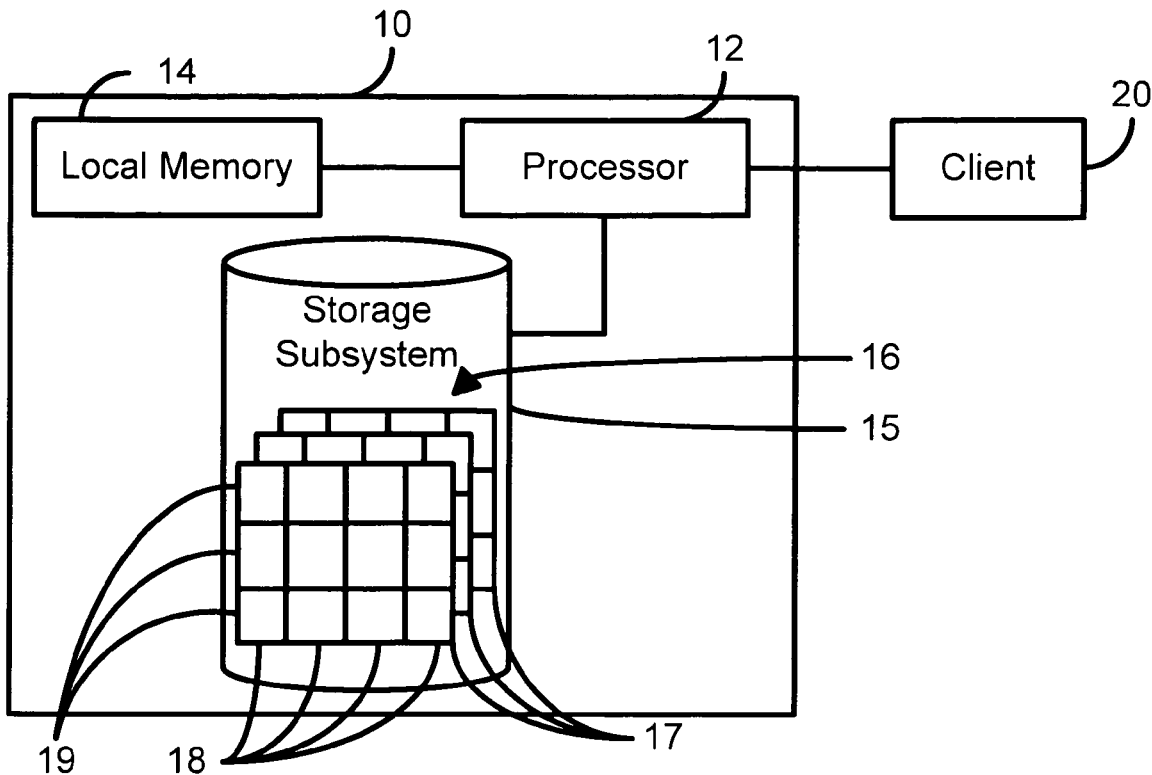
FIG. 1 is a diagram depicting a conventional database management system.
Figure 2:
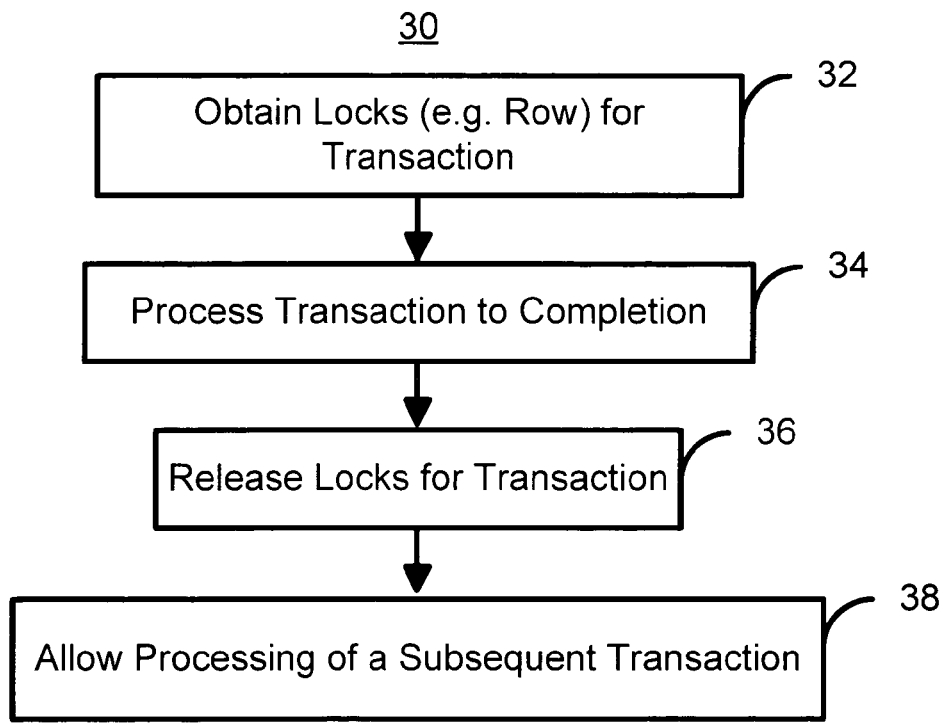
FIG. 2 is a flow chart depicting a conventional method for processing transactions in a database management system.

Referring to FIGS. 1 and 3, the method 100 commences when a transaction has been provided to the database system 10 for processing. Thus, the transaction may originate in a client 20. Thus, the transaction may include one or more statements, such as SQL statements. It is determined whether the transaction fulfills all the criteria, via step 102. The criteria include predetermined characteristics which the transaction may share with other transactions. In a preferred embodiment, the characteristics include the transaction being an addition or subtraction, the transaction operating on data in a specified column for which a shared numeric lock (described below) is used, and the transaction not modifying data in other columns that are not candidates for a shared numeric lock.

If the transaction does not fulfill all of the criteria, then the transaction may be processed in a conventional manner, via step 104. Thus, the method 30 might be invoked in step 104 to create conventional row or page locks, perform the processing for the transaction, and release the conventional row or page locks. If, however, the transaction does fulfill all of the criteria, then it is ensured that the corresponding portion(s) of the desired table, such as the desired column(s), have a shared numeric lock, via step 106. In one embodiment, step 106 includes creating the shared numeric lock or adding the transaction to a previously created shared numeric lock. Processing of the transaction may be performed using the shared numeric lock, via step 108.

Figure 4:
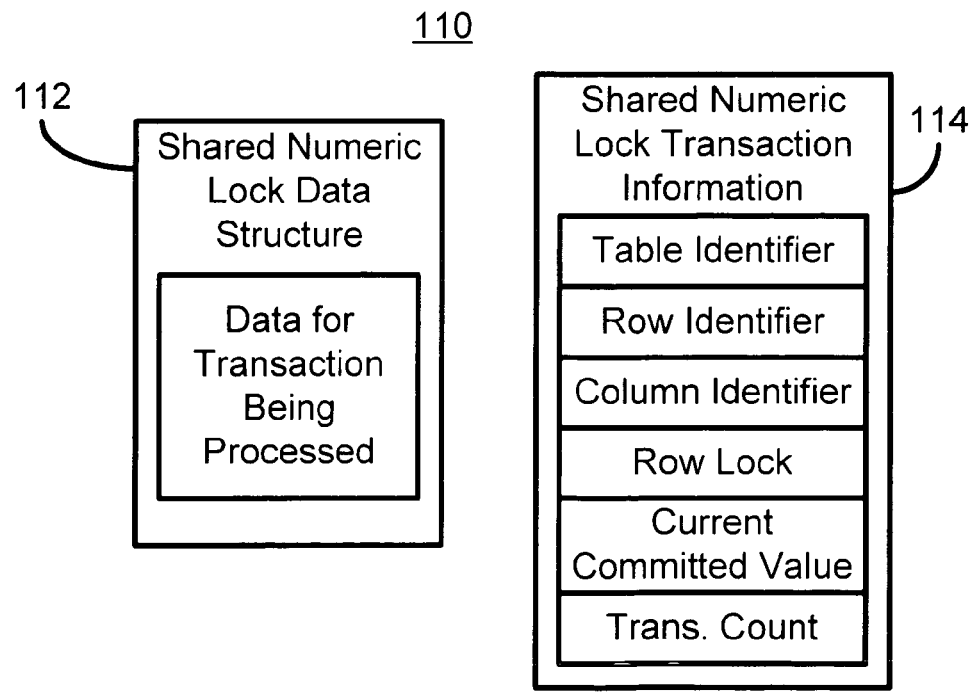
FIG. 4 depicts one embodiment of a shared numeric lock 110 in accordance with the present invention.

FIG. 4 depicts one embodiment of a shared numeric lock 110 in accordance with the present invention. The shared numeric lock 110 includes a shared numeric lock data structure (SNL data structure) 112 and shared numeric lock transaction information (SNL transaction information) 114. A shared numeric lock 110 is a lock which allows transactions fulfilling all of the criteria to be processed without releasing the shared numeric lock between transactions. The shared numeric lock 110 preferably corresponds to a particular column. Thus, the shared numeric lock 110 preferably allows statements in multiple transactions that access the same column and row to be processed without releasing the shared numeric lock. The shared numeric lock 110 also preferably includes the SNL data structure 112 used to protect the integrity of the memory 14 during processing of transactions utilizing the shared numeric lock. Consequently, the SNL data structure 112 is used to obtain, hold, and update data for a transaction while the transaction is being processed in step 108. The SNL transaction information 114 preferably includes a list of the transaction(s) using the shared numeric lock and associated pointers to the transaction(s). In addition, the SNL transaction information 114 preferably includes other information related to the shared numeric lock and the participating transaction(s). For example, in one embodiment the SNL information 114 includes, but is not limited to, a table identifier such as a table number, row identifier(s) such as row number(s) for each transaction, column identifier(s) such as column number(s), a row lock for the row that contains the column, a current committed value of the measure that is being updated for a transaction currently being processed, and a transaction count indicating a number of transactions sharing the shared numeric lock. Moreover, other information, such as the criteria which a transaction must fulfill, may be provided in the SNL transaction information 114 and used by the shared numeric lock 110.

Thus, using the shared numeric lock 110 and the method 100, multiple transactions sharing common characteristics might be processed without releasing the shared numeric lock 110 between transactions. Stated differently, statements which are part of different transactions fulfilling all of the criteria and which attempt to access the same column may be processed without releasing the shared numeric lock. Instead, the shared numeric lock 110 might be released only after all of the transactions fulfilling all of the criteria have completed processing. As a result, the efficiency with which the transactions are performed may be enhanced.

Figure 5:
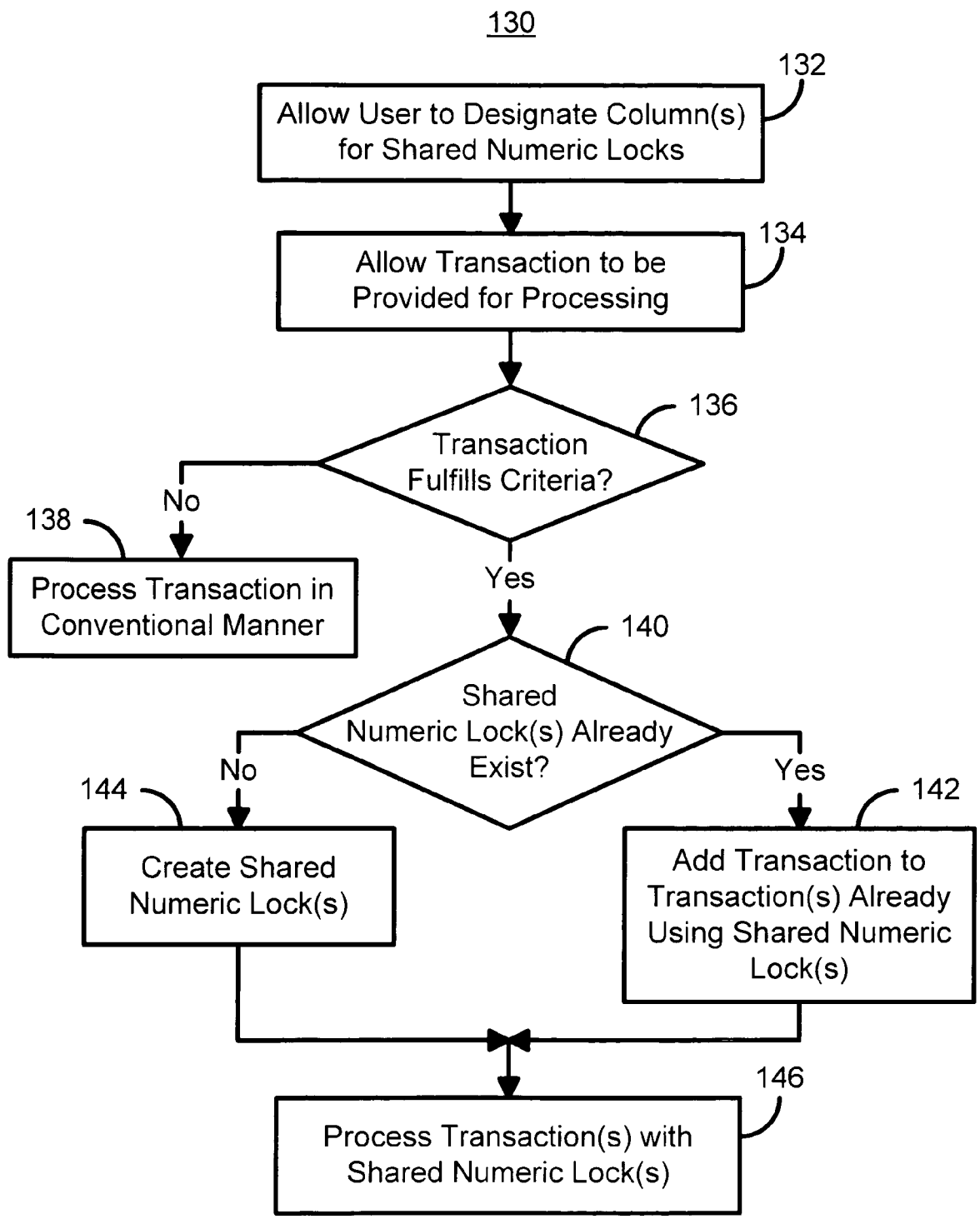
FIG. 5 is a flow chart depicting one embodiment of a method in accordance with the present invention for processing transactions in a database management system.

FIG. 5 is a flow chart depicting one embodiment of a method 130 in accordance with the present invention for processing transactions in a database management system. The method 130 is described in the context of the database system 10 depicted in FIG. 1 and the shared numeric lock 110 depicted in FIG. 4. One of ordinary skill in the art will readily recognize, however, that the method 100 may be used with other database systems and other structures for the shared numeric lock.

Referring to FIGS. 1, 4, and 5, the user is allowed to designate portions of tables with which a shared numeric lock can be used, via step 132. In a preferred embodiment, the user selects columns with which a shared numeric lock can be used. Also in a preferred embodiment, this designation is performed when the table 16 or column 18 is created. For example, for a table 16 entitle inventory_table, the create table statement might be:

```
create table inventory_table (
    Item_num integer,
    Item_description char(50),
    Stock_on_hand integer USE SNLOCKS);
```

Where the statement USE SNLOCKS indicates that shared numeric locks can be used with the column stock_on_hand. Thus, in step 132 the user may identify columns in a table with which shared numeric locks can be used. A transaction may be provided to the database system 10 for processing, via step 134. The transaction may originate in a client 20. The transaction is for at least one column and performs certain operations on the data in the column(s). Thus, the transaction may include one or more statements, such as SQL statements.

It is determined whether the transaction fulfills all the criteria, via step 136. The criteria include predetermined characteristics which the transaction may share with other transactions. In a preferred embodiment, the characteristics include the transaction being an addition or subtraction, the transaction operating on data in a specified column for which a shared numeric lock (described below) is used, and the transaction not modifying data in other columns that are not candidates for a shared numeric lock. For example, in the inventory_table example above, the transaction should update only the stock_on_hand column. In addition, the transaction should be an addition or subtraction of a literal value from the measure in the stock_on_hand column. If a transaction does not update this column or also updates the item_num or item_description column, then the transaction may not fulfill all of the criteria.

If the transaction does not fulfill all of the criteria, then the transaction may be processed in a conventional manner, via step 138. Thus, the method 30 might be invoked in step 104 to create conventional row or page locks, perform the processing for the transaction, and release the conventional row or page locks. If, however, the transaction does fulfill all of the criteria, then it is determined whether a shared numeric lock already exists for the column, via step 140. If so, then the transaction is added to a list of transactions for the pre-existing shared numeric lock, via step 142. Otherwise, the shared numeric lock, such as the shared numeric lock 110, is created, via step 144. Step 144 thus includes providing a shared numeric lock 110 including the SNL data structure 112 and SNL transaction information 114 such as the table number, row number, column number, row lock, current committed value of the measure (data) in the column and the transaction count indicating the number of transactions sharing the shared numeric lock 110. In addition, a transaction list of the transactions sharing the shared numeric lock is preferably maintained, for example in the SNL transaction information 114. For example, the transaction list may include a current element that is the transaction currently being processed, a pointer to the shared numeric lock 110, a pointer to the next element, and the change in value for the current element. Also in step 144, a row lock is preferably obtained.

Processing of the transaction may be performed using the shared numeric lock, via step 146. In general, processing of the transaction may be handled in a conventional manner. Upper and lower bounds for particular columns are also handled in step 146. Thus, floors which, for example, prevent the stock inventory from decreasing below zero or prevent a credit card balance from exceeding the limit may be used in determining whether the transactions are allowed to change the measure of the column stored in the storage subsystem 15.

In addition, in a preferred embodiment, commit statements (commits) are also handled in step 146 such that the transactions are committed in order. Processing of commits is described below in FIG. 6. Thus, step 146 allows the transaction to be processed including committing new values to the storage subsystem 15. Note that although the method 130 is described serially, during operation, transactions may be provided at any time. Consequently, different portions of the method 130 may be executing for different transactions at substantially the same time.

Thus, using the method 130 and the shared numeric lock 110, multiple transactions may be processed without releasing the locks. Consequently, transactions which are updating the same column in a similar manner need not wait for the release of a lock before commencing processing. Thus, the method 130 may allow for more efficient execution of such transactions. Applications such as banking and inventory as well as many other applications may, therefore, have improved performance. In addition, the Transaction Processing Performance Counsel's third benchmark (TPC-C benchmark) application simulates a warehouse environment. Use of the method 100 and/or 130 and the shared numeric lock 110 may also allow database systems to achieve improved TPC-C benchmark performance.

Figure 6:
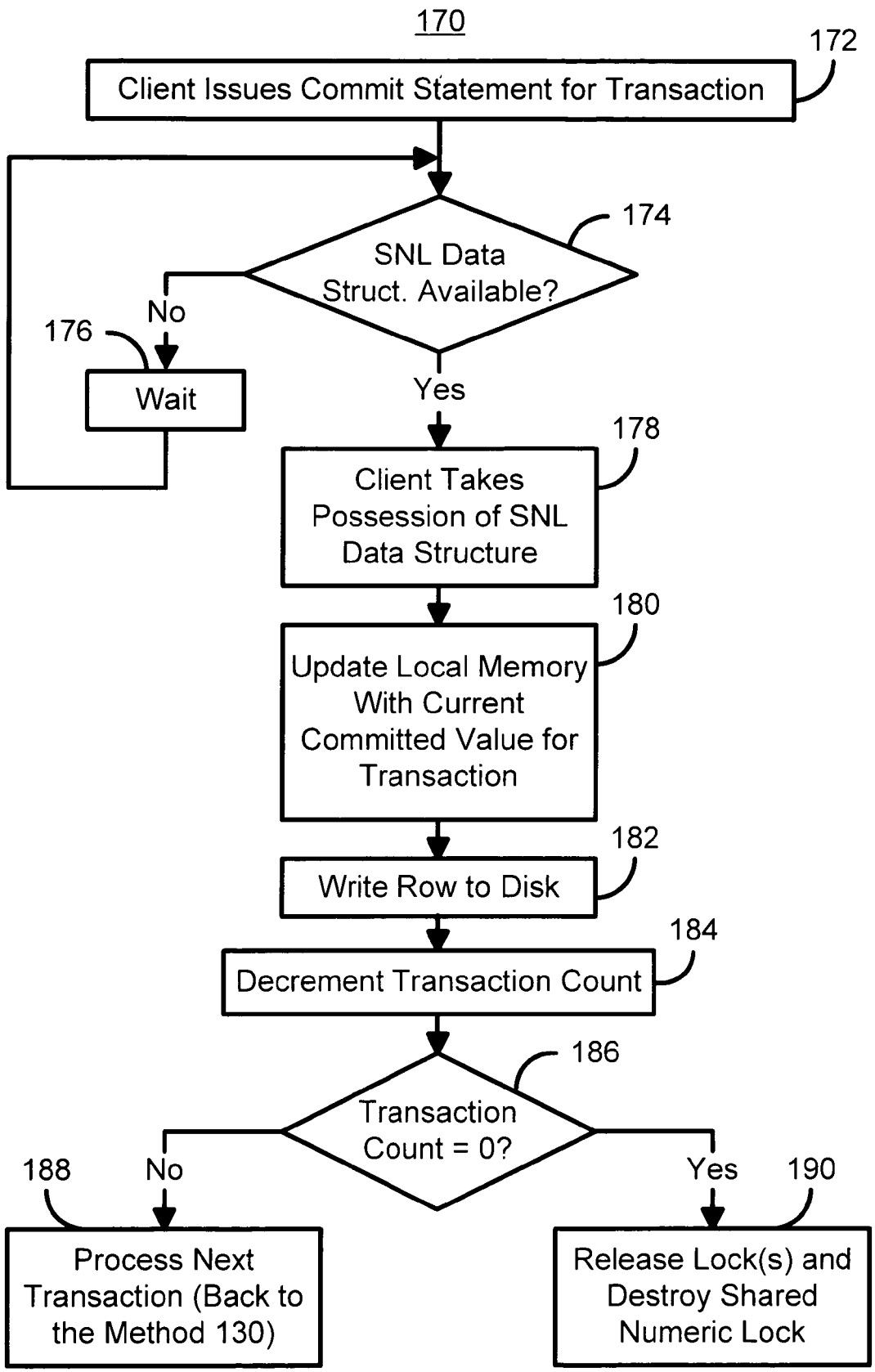
FIG. 6 is a flow chart depicting one embodiment of a method in accordance with the present invention for processing commits in a database management system.

FIG. 6 is a flow chart depicting one embodiment of a method 170 in accordance with the present invention for processing commits in a database management system. The method 170 is thus preferably used for the portion of step 146 of the method 130 in which commits are performed. The method 170 is described in the context of the database system 10 depicted in FIG. 1 and the shared numeric lock 110 depicted in FIG. 4. One of ordinary skill in the art will readily recognize, however, that the method 170 may be used with other database systems and other structures for the shared numeric lock.

Referring to FIGS. 1, 4, and 6, a client issues a commit statement for a transaction, via step 172. The commit order is determined by the time a particular client issues such a commit statement. It is determined whether the client can obtain the SNL data structure 112, via step 174. If not, for example because the SNL data structure 112 is being used by another transaction, then the transactions for which a commit is desired waits until the SNL data structure 112 is free. Consequently, the client waits in step 176 and step 174 is retried. If the data structure can be obtained, then the client takes possession of the data structure, via step 178. The local memory 14 may then be updated with the current committed value for the transaction, via step 180. The row may then be written to disk in the storage subsystem 15, via step 182.

Because the new value is committed and the transaction is essentially finished processing, the transaction count is decremented, via step 184. It is determined whether the transaction count is zero, via step 186. If the transaction count is not zero, then remaining transactions using the shared numeric lock may be processed in step 146, via step 188. If the transaction count is zero, then no transactions using the shared numeric lock remain. Consequently, the row lock may be released and the shared numeric lock 110 destroyed, via step 190. Thus, the method 170 allows the new values to be committed to the storage subsystem 15.

A method and system for more efficiently performing multiple transactions on a column. The present invention has been described in accordance with the embodiments shown, and one of ordinary skill in the art will readily recognize that there could be variations to the embodiments, and any variations would be within the spirit and scope of the present invention.

Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Accordingly, many modifications may be made by one of ordinary skill in the art without departing from the spirit and scope of the appended claims.

I claim;

1. A method for performing at least one transaction on at least one column of a table in a database system, the method comprising:

determining whether a first transaction of the at least one transaction fulfills all of at least one criteria, wherein the at least one criteria includes the at least one transaction being an addition or a subtraction on at least one value only for the at least one column, the at least one transaction operating on data in a specified column for which a shared numeric lock is used, and the at least one transaction not modifying data in other columns that are not candidates for a shared numeric lock;

ensuring that the at least one column is in a shared numeric lock if the first transaction fulfills all of the at least one criteria, wherein the shared numeric lock is a lock the allows at least a second transaction fulfilling all of the at least one criteria to access the same column concurrently with the first transaction without releasing the shared numeric lock between transactions, and wherein the shared numeric lock is released only after all of the transactions fulfilling all of the criteria have completed processing; and processing the first transaction, wherein processing the first transaction comprises:

adding the first transaction to a set of concurrent transactions if the shared numeric lock already exists for the column, adding the first transaction including creating a shared numeric lock data structure for the first transaction;

creating the shared numeric lock if the shared numeric lock does not already exist for the column, creating the shared numeric lock including creating the shared numeric lock data structure for the first transaction;

obtaining a row lock for the row corresponding to the first transaction;

tracking data relating to the first transaction, wherein the data includes a table number, a row number, a column number, a row lock, a current committed value of a measure of the first transaction and a concurrent transaction count indicating a number of transactions sharing the shared numeric lock; and managing a commit for the first transaction, wherein the managing the commit comprises:

obtaining the shared numeric lock data structure for the first transaction;

updating a current committed value for the first transaction;

writing the current committed value for the first transaction;

decrementing a concurrent transaction count indicating a number of the at least one of transaction using the shared numeric lock; and if the transaction count is zero after the decrementing, releasing the shared numeric lock.

2. A database system including a table having at least one column capable of being altered by at least one transaction, the system comprising:

a processor for determining whether a first transaction of the at least one transaction fulfills all of at least one criteria, wherein the at least one criteria includes the at least one transaction being an addition or a subtraction on at least one value only for the at least one column, the at least one transaction operating on data in a specified column for which a shared numeric lock is used, and the at least one transaction not modifying data in other columns that are not candidates for a shared numeric lock; and a shared numeric lock for the at least one transaction, wherein the processor ensures that the at least one column is in a shared numeric lock if the first transaction fulfills all of the at least one criteria, wherein the shared numeric lock is a lock the allows at least a second transaction fulfilling all of the at least one criteria to access the same column concurrently with the first transaction without releasing the shared numeric lock between transactions, and wherein the shared numeric lock is released only after all of the transactions fulfilling all of the criteria have completed processing, wherein the processor processes the first transaction, wherein processing the first transaction comprises:

adding the first transaction to a set of concurrent transactions if the shared numeric lock already exists for the column, adding the first transaction including creating a shared numeric lock data structure for the first transaction;

creating the shared numeric lock if the shared numeric lock does not already exist for the column, creating the shared numeric lock including creating the shared numeric lock data structure for the first transaction;

obtaining a row lock for the row corresponding to the first transaction;

tracking data relating to the first transaction, wherein the data includes a table number, a row number, a column number, a row lock, a current committed value of a measure of the first transaction and a concurrent transaction count indicating a number of transactions sharing the shared numeric lock; and managing a commit for the first transaction, wherein the managing the commit comprises:

obtaining the shared numeric lock data structure for the first transaction;

updating a current committed value for the first transaction;

writing the current committed value for the first transaction;

decrementing a concurrent transaction count indicating a number of the at least one of transaction using the shared numeric lock; and if the transaction count is zero after the decrementing, releasing the shared numeric lock.

3. The database system of claim 2 wherein the shared numeric lock includes a shared numeric lock data structure.

4. The database system of claim 3 wherein the shared numeric lock includes data for the first transaction, the data includes a table number, a row number, a column number, a row lock, a current committed value of a measure of the first transaction and a concurrent transaction count indicating a number of transactions sharing the shared numeric lock.

5. The database structure of claim 2 wherein the at least one criteria includes the at least one transaction being an addition or a subtraction on at least one value only for the at least one column.

6. A computer-readable storage medium including a program executed by a processor for performing at least one transaction on at least one column of a table in a database system, the program including instructions for:
- determining whether a first transaction of the at least one transaction fulfills all of at least one criteria, wherein the at least one criteria includes the at least one transaction being an addition or a subtraction on at least one value only for the at least one column, the at least one transaction operating on data in a specified column for which a shared numeric lock is used, and the at least one transaction not modifying data in other columns that are not candidates for a shared numeric lock;
- ensuring that the at least one column is in a shared numeric lock if the first transaction fulfills all of the at least one criteria, wherein the shared numeric lock is a lock the allows at least a second transaction fulfilling all of the at least one criteria to access the same column concurrently with the first transaction without releasing the shared numeric lock between transactions, and wherein the shared numeric lock is released only after all of the transactions fulfilling all of the criteria have completed processing; and
- processing the first transaction, wherein processing the first transaction comprises:
  - adding the first transaction to a set of concurrent transactions if the shared numeric lock already exists for the column, adding the first transaction including creating a shared numeric lock data structure for the first transaction;
  - creating the shared numeric lock if the shared numeric lock does not already exist for the column, creating the shared numeric lock including creating the shared numeric lock data structure for the first transaction;
  - obtaining a row lock for the row corresponding to the first transaction;
  - tracking data relating to the first transaction, wherein the data includes a table number, a row number, a column number, a row lock, a current committed value of a measure of the first transaction and a concurrent transaction count indicating a number of transactions sharing the shared numeric lock; and
  - managing a commit for the first transaction, wherein the managing the commit comprises:
    - obtaining the shared numeric lock data structure for the first transaction;
    - updating a current committed value for the first transaction;
    - writing the current committed value for the first transaction;
    - decrementing a concurrent transaction count indicating a number of the at least one of transaction using the shared numeric lock; and
  - if the transaction count is zero after the decrementing, releasing the shared numeric lock.

* * * * *